F. DOUTHITT.
METHOD OF ASCERTAINING THE COMBINATION OF STOPS FOR THE PRODUCTION OF HALF TONE DOT NEGATIVES WITH A PROCESS CAMERA.
APPLICATION FILED JAN. 22, 1917.
1,289,129. Patented Dec. 31, 1918.
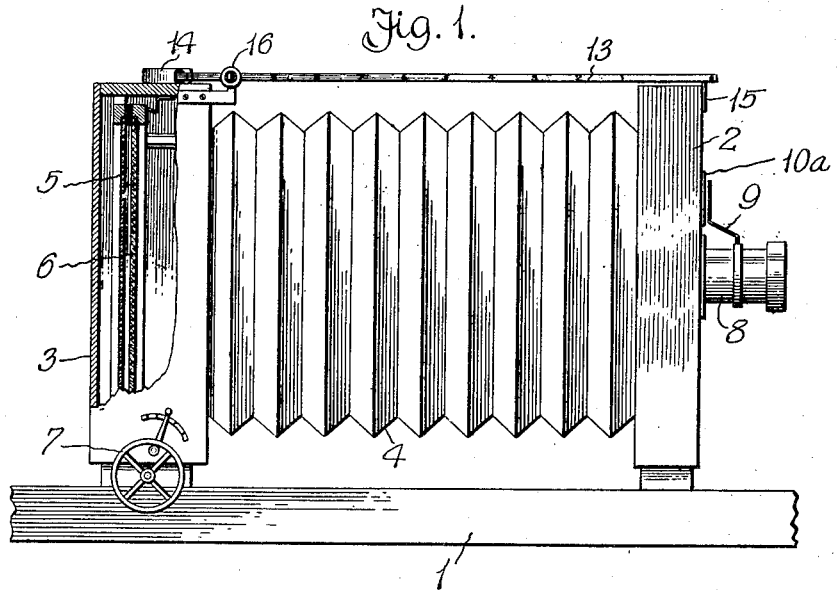
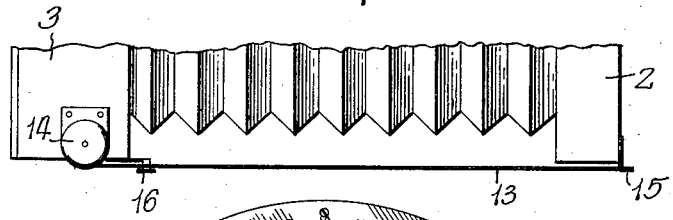
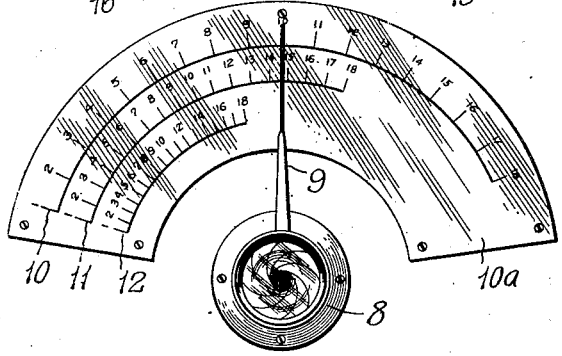
Inventor
Fletcher Douthitt,
Witness
Chas. W. Stauffiger
Karl H. Butler
By
Attorneys

UNITED STATES PATENT OFFICE.

FLETCHER DOUTHITT, OF DETROIT, MICHIGAN.

METHOD OF ASCERTAINING THE COMBINATION OF STOPS FOR THE PRODUCTION OF HALF-TONE DOT NEGATIVES WITH A PROCESS-CAMERA.

1,289,129.  Specification of Letters Patent.  Patented Dec. 31, 1918.

Application filed January 22, 1917. Serial No. 143,752.

*To all whom it may concern:*

Be it known that I, FLETCHER DOUTHITT, a citizen of the United States of America, residing at Detroit, in the county of Wayne and State of Michigan, have invented certain new and useful Improvements in Methods of Ascertaining the Combination of Stops for the Production of Half-Tone Dot Negatives with a Process-Camera, of which the following is a specification, reference being had therein to the accompanying drawings.

This invention relates to an automatic half-tone stop indicator and a method of obtaining the stop and the object of my invention is to provide a camera with attachments which will permit of absolute accuracy for regulating the shutter stops for half tone negatives in the photo engraving art.

Briefly stated, conditions are encountered in making half tone negatives which do not exist in the production of line negatives. In line work there are no graduations between black and white, but in half tone operations, it is necessary to reproduce intermediate tones. To obtain tone graduations upon a metal plate, a cross line screen is employed which will produce a great many little black dots and clear spaces. In order that a negative may give the most satisfactory results, certain relations must, in general, exist between the size of the clear spaces and the opaque dots, and these relations have been worked out so that an operator, familiar with the work to be reproduced, may select a proper screen and make certain adjustments. Principally among these are the adjustments of the distance between the screen and a sensitized plate, the bellows extension of the camera or focal length, size and shape of the aperture of the diaphragm, and the proper diaphragm stop. The formation of the dots in their relative proportions most largely depends upon the manner in which these relations are adjusted to each other, and my invention has special reference to the regulating of the diaphragm or shutter stop relative to the bellows extension or focal length.

Published tables and rules have determined the proper screen and plate separation, but I am unaware of any positive means which will guide an operator in determining the proper stop for a bellows extension. So far it has been mere guesswork on the part of an operator after following certain established formulas for screen separation given by recognized authorities, since, the standard method of making a half-tone negative is based upon the use of four stops:—

First, the high light stop transfers the white parts of the copy to the plate. This stop secures the general outline of the copy to be reproduced.

Next, the pick up stop that gives the detail in the tone of the copy, between the medium dark tones and the white tones, and is the basis of all other stops used during the exposure, and should be about one-sixty-fourth of the bellows extension of focal length, that is, from the diaphragm to the sensitive plate.

Third, the detail stop which gives the tones between the dark tones and the medium tones, and Fourth, the flash stop that is used with the copy covered with white paper and gives a dot in the extreme black which cannot be obtained except by the use of such paper.

Referring to the pick up stop as a basis of all other stops and according to the ruling of any given screen, it will be found that this pick up stop will give under a microscope or focusing glass, dots upon the ground glass of the camera that show a decided opaque line separating every dot. This pick up stop will be one-sixty-fourth of the bellows extension. To determine the high light stop or stop to secure the white of the copy, it will be found under the focusing glass enlarging pick up stop one-third its diameter that an image of the dot on the ground glass is secured showing a faint opaque image of the dot that secured the details of the picture. The relative value of the exposure of these two stops is three-to-one. If the whites of the copy are extremely white and have been timed ten seconds on high light, it is necessary to time three times as long or thirty seconds to secure the second tones of the copy. The dark tones of the copy are secured by using a stop one-third smaller in diameter than the pick up stop which is one-sixty-fourth of the bellows extension, and if this proportion of stops is followed out it will be found that the third stop will not overlap or destroy the value of the higher tone in the copy to be reproduced. The third stop, in time, requires from three to four exposures of the first and second stops as it is used to secure the very dark parts of the copy. The extreme black in any given copy must be secured, as is the common practice, by using a flash sheet or white paper, and this stop should be one-sixth the diameter of the high light or first stop, and should be timed to produce the desired result as to dot formation.

To carry the above into effect, I provide a camera with a bellows scale and a stop scale, one depending upon the other for desired results. As showing a preferred form of the indicator, reference will be had to the drawing, wherein—

Figure 1 is a side elevation of a portion of the camera, party broken away and partly in section;

Fig. 2 is a plan of a portion of the camera, and

Fig. 3 is a front elevation of the diaphragm or shutter provided with the stop indicator.

In the drawing, 1 denotes a camera bed for a camera having a front section 2 and a rear section 3, these sections being connected by the usual bellows 4. The rear section 3 accommodates sensitized plate 5 and a screen 6, and as usual, this section, has mechanism by which the screen 6 may be adjusted relative to the plate 5.

The front section 2 of the camera has the usual lens, diaphragm or shutter, generally designated 8, and my first improvement consists in providing the diaphragm with an indicator or hand 9 adapted to be manually shifted in front of an indicia plate 10$^a$ mounted on the front section 2 of the camera. This indicia plate is provided with three sets of graduations 10, 11 and 12, the first set of graduations being for high light stops; the second set of graduations for the pick up stops, and the third set of graduations for detail stops.

My next improvement in connection with the camera consists in connecting the front and rear sections thereof by a rollable scale 13 having graduations or indicia corresponding to either set of graduations on the indicia plate 10$^a$. The scale 13 has one end thereof attached to a suitable take-up device 14 on the rear section 3 of the camera and the opposite end of the scale is suitably attached to a bracket 15 carried by the front section 2 of the camera. On the rear section 3 of the camera there is a gage or sight member 16 through which the graduations of the scale may be readily observed, and it is at this point of the camera that the bellows extension or focal length from the plate to the lens or diaphragm, is determined.

The take-up device 14 is somewhat similar to a spring wound tape measure comprising a casing having a spring actuated roll on which the scale 13 will be wound when the front and rear portions of the camera are adjusted toward each other.

The scale 13 is in the form of a flexible piece of tape on which the graduations can be easily placed, and while these graduations take care of three stops, it is possible for an operator to further graduate the scale and set the end thereof held by the bracket 15 so that other stops may be attained.

As an example of the method of ascertaining the combination of stops for the production of half tone dot negatives with a process camera by a plurality of exposures, the screen through which the negative is made is set at the proper distance from the sensitive plate. This distance is determined by using the screen distances recommended by the manufactures of the screen. The first or top lines of the dots are found by focusing up a copy to the exact size of the copy, then closing the diaphragm until the rays of light show by the microscope on the ground glass that they just meet at the sides of the dot formed by the rays of light passing through the screen. The diaphragm opening is measured at this opening and the size of the opening is marked on the sliding tape and also upon the lens scale. As an example, take 133 line screen used with an 18 inch focus lens copying the same size. The established formula for a screen of 133 lines is one-fourth of an inch from the sensitive plate.

The rays of light will just meet on the plate with the diahragm opening three-fourths of an inch or twelve-sixteenths of an inch. An indicated point on the sliding tape and also a given point on the diaphragm indicator must be marked 12 to designate the size of the diaphragm opening. On an 18 inch focus lens the sensitive plate will always be twice 18 or 36 inches when copying at the same size. Now the microscope has shown that twelve-sixteenths of an inch is the proper stop to use for the white parts of a copy. The second stop is found by taking two-thirds of the diameter of the first stop or eight-sixteenths, and with the indicator on the second point, it is necessary to mark 12 on the second line of the indicator plate. The third stop is found by taking two-thirds of the diameter of the second stop and moving the indicator on the lens scale to this point on the third line and marking the same 12.

To mark the rest of the lens scale, the distance between where the lens scale is marked twelve-sixteenths and the point where the diaphragm is completely closed, must be evenly spaced, showing each diaphragm opening one-sixteenth of an inch smaller than the opening above it. The sliding tape must then be spaced also into twelve equal parts from the thirty-six inch or No. 12 mark down to zero, which would bring the marks on the scale for an 18 inch lens 52 and 4/11 part of 1/16 or 52 and 5/16 of an inch apart.

As an example for this marking for the sliding tape scale 18 inch focus lens, with sensitive plate 36 inches from diaphragm 36 times 16 equals 576 sixteenths or 52 and 4/11 of 1/16 part of an inch between each number on the sliding tape.

One embodiment of my invention has been illustrated, but it is to be understood that the structural elements are susceptible to such variations and modifications as fall within the scope of the appended claims.

What I claim is:—

1. The method of ascertaining the combination of stops for the production of half tone dot negatives by a plurality of exposures in a camera having adjustable front and rear sections, a sliding tape connecting the front and rear camera sections, a ground glass in the rear camera section, an adjustable screen in front of said ground glass, a lens diaphragm carried by the front camera section, and a scale for said lens diaphragm, which method consists in focusing a copy at same size on the ground glass, adjusting the lens diaphragm to a predetermined diameter, then adjusting the screen to show grouped dots on the ground glass distinct from each other, then indicating the diameter of the diaphragm opening on the lens scale and providing said lens scale with various stop spaces, dividing the tape into equal spaces, and then dividing each stop space on the lens scale into the same number of spaces as on said tape, so that when the lens diaphragm is set in accordance with the tape scale representing the bellows extension, a predetermined dot formation may be obtained for each stop.

2. The method of ascertaining stops for the production of half tone negatives by a plurality of exposures in a camera having adjustable front and rear sections, a sliding tape connecting the front and rear camera sections, a ground glass in the rear camera section, an adjustable screen in front of said ground glass, a lens diaphragm carried by the front camera section, and a scale for said lens diaphragm having a plurality of lines, which method consists in focusing a copy of the same size on the ground glass, adjusting the lens diaphragm to a determined diameter, then adjusting the screen to show grouped dots on the ground glass distinct from each other, then indicating the diameter of the diaphragm opening on the first line of the lens scale and also on the sliding tape, then in each succeeding exposure adjusting the lens stop two-thirds of the diameter of a previous stop and indicating the same on the succeeding lines of the lens scale, and then dividing the distance on the tape between the ground glass and the lens diaphragm into an equal number of parts by dividing the distance on the first line of the lens scale and the point where the diaphragm is completely closed into an equal number of spaces corresponding to the tape.

3. The method of ascertaining the combination of stops for the production of half tone dot negatives by a plurality of exposures in a camera having adjustable front and rear sections, a sliding tape connecting the front and rear camera sections, a ground glass in the rear camera section, an adjustable screen in front of said ground glass, a lens diaphragm carried by the front camera section, and a scale for said lens diaphragm having a plurality of lines, which method consists in focusing the copy at same size on ground glass, then setting the diameter of the lens diaphragm at a size equal to the specified portion of the distance between the diaphragm and ground glass, then placing a microscope upon the clear space in the center of the ground glass, then moving the screen to a position to show the transparent dots on the ground glass with the grouped dots distinct from each other, then measuring the diaphragm opening and indicating the size of the diaphragm at a determined point on the first line of the lens scale, and also on the sliding tape, then in each succeeding exposure adjusting the lens stop two-thirds of the diameter of the previous stop and indicating the same on the succeeding line of the lens scale, and then dividing the distance on the tape between the ground glass and the lens diaphragm into an equal number of parts, dividing the distance between the predetermined points on the first line of the lens scale, and the point where the diaphragm is completely closed into an equal number of spaces corresponding to the tape.

4. The method of ascertaining the combination of stops for the production of half tone dot negatives by a plurality of exposures in a camera having adjustable front and rear sections, a sliding tape connecting the front and rear sections, a pointer coacting with the tape, a ground glass in the rear camera section, an adjustable one hundred and thirty-three line screen one-fourth of an inch in front of said ground glass, a lens diaphragm carried by the front camera section, and a scale for said lens diaphragm having a plurality of lines and a co-acting pointer, which method consists in focusing a copy at the same size on the ground glass, then setting the diameter of the lens diaphragm at a size equal to an eighteen inch focus lens, then placing a microscope upon the clear space in the center of the ground glass, then moving the screen thirty-six inches to a position to show the transparent dots on the ground glass with the grouped dots distinct from each other, then measuring the diaphragm opening and indicating the size of the diaphragm which is twelve-sixteenths of an inch at a determined point on the first line of the lens scale and also on the sliding tape, then in each succeeding exposure adjusting the lens stop two-thirds of the diameter of the previous stop and indicating the same on the succeeding lines of the lens scale, and then dividing the distance on the tape between the ground glass and the lens diaphragm into an equal number of spaces each fifty-two and five-sixteenths of an inch and dividing the distance between the predetermined point on the first line of the lens scale and the point where the diaphragm is completely closed into an equal number of spaces proportionate to the tape.

In testimony whereof I affix my signature in the presence of two witnesses.

FLETCHER DOUTHITT.

Witnesses:
KARL H. BUTLER,
ANNA M. DORR.